(12) United States Patent
Clark

(10) Patent No.: US 7,751,635 B2
(45) Date of Patent: Jul. 6, 2010

(54) COMPRESSION INTO A FIXED SIZE BUFFER

(75) Inventor: James David Clark, Newport (AU)

(73) Assignee: Canon Kabushiki Kaisha, Tokyo (JP)

( * ) Notice: Subject to any disclaimer, the term of this patent is extended or adjusted under 35 U.S.C. 154(b) by 1036 days.

(21) Appl. No.: 10/761,280

(22) Filed: Jan. 22, 2004

(65) Prior Publication Data

US 2004/0208381 A1    Oct. 21, 2004

(30) Foreign Application Priority Data

Jan. 30, 2003    (AU) .............................. 2003900531

(51) Int. Cl.
G06K 9/46    (2006.01)

(52) U.S. Cl. ...................... 382/244; 348/419.1; 341/65; 358/474; 704/501

(58) Field of Classification Search ................. 382/239, 382/100, 232, 233, 234, 235, 238, 244, 246, 382/250; 348/395, 387.1, 390.1, 393.1, 419.1; 341/50, 51, 54, 65, 67; 358/539, 426.02, 358/426.07, 426.13, 426.14, 426.16, 505, 358/500, 474, 486; 704/501, 504

See application file for complete search history.

(56) References Cited

U.S. PATENT DOCUMENTS

| 5,504,823 | A | 4/1996 | Yoon .......................... 382/233 |
| 5,699,457 | A | 12/1997 | Adar et al. .................. 382/239 |
| 5,748,786 | A | 5/1998 | Zandi et al. ................. 382/240 |
| 5,761,345 | A | 6/1998 | Saito et al. ................. 382/246 |
| 5,768,424 | A | 6/1998 | Long .......................... 382/232 |
| 5,815,097 | A | 9/1998 | Schwartz et al. .............. 341/51 |
| 5,818,369 | A * | 10/1998 | Withers ...................... 341/107 |
| 5,936,670 | A | 8/1999 | Frencken ................ 375/240.14 |
| 6,016,360 | A | 1/2000 | Nguyen et al. .............. 382/166 |
| 6,031,572 | A | 2/2000 | Christopoulos ............. 348/397 |
| 6,246,798 | B1 | 6/2001 | Andrew et al. ............. 382/240 |
| 6,259,819 | B1 | 7/2001 | Andrew et al. ............. 382/248 |
| 6,259,820 | B1 * | 7/2001 | Stone ......................... 382/250 |

(Continued)

FOREIGN PATENT DOCUMENTS

EP    0782345 A2    7/1997

(Continued)

OTHER PUBLICATIONS

Lee, JPEG 2000 Part I Final Committee Draft Version 1.0, Mar. 16, 2000, ISO, 1, 1-205. (http://www.jpeg.org/public/fcd15444-1.pdf).*

*Primary Examiner*—Anand Bhatnagar
(74) *Attorney, Agent, or Firm*—Fitzpatrick, Cella, Harper & Scinto

(57) ABSTRACT

The method compresses image data into a fixed sized memory. The image is encoded in scans, where the scans are ordered from a perceptually most significant scan to a perceptually least significant scan. The scans also have an attribute 210 determining whether a scan is active or inactive. The method comprises an encoding, transferring and setting step. The encoding step 326, 348 encodes active scans of image data into scan bit-stream data. The transferring step 330, 352 transfers the encoded scan bit-stream data to the fixed size memory. The setting step 452 sets, if the fixed size memory becomes full, the attribute of a perceptually least significant scan to inactive.

16 Claims, 10 Drawing Sheets

U.S. PATENT DOCUMENTS

| | | | |
|---|---|---|---|
| 6,263,109 B1 * | 7/2001 | Ordentlich et al. | 382/232 |
| 6,263,110 B1 | 7/2001 | Andrew et al. | 382/232 |
| 6,266,414 B1 | 7/2001 | Bradley et al. | 380/240 |
| 6,266,450 B1 | 7/2001 | Yip et al. | 382/240 |
| 6,327,392 B1 * | 12/2001 | Li | 382/248 |
| 6,351,568 B1 | 2/2002 | Andrew | 382/239 |
| 6,411,736 B1 | 6/2002 | Yip et al. | 382/233 |
| 6,420,979 B1 | 7/2002 | Katayama | 341/51 |
| 6,462,681 B1 * | 10/2002 | Van Der Vleuten et al. | 341/50 |
| 6,570,510 B2 | 5/2003 | Chen et al. | 341/51 |
| 6,606,416 B1 | 8/2003 | Yip et al. | 382/240 |
| 6,636,325 B1 * | 10/2003 | Kurase | 358/1.14 |
| 6,664,902 B2 | 12/2003 | Andrew et al. | 341/50 |
| 6,804,402 B2 | 10/2004 | Andrew | 382/240 |
| 7,016,545 B1 * | 3/2006 | Schwartz et al. | 382/239 |
| 2002/0003905 A1 * | 1/2002 | Sato et al. | 382/240 |
| 2003/0169936 A1 * | 9/2003 | Zandi et al. | 382/240 |
| 2003/0182544 A1 * | 9/2003 | Wise et al. | 712/300 |

FOREIGN PATENT DOCUMENTS

| | | |
|---|---|---|
| GB | 2278973 | 12/1994 |
| WO | WO 98/13787 | 4/1998 |

* cited by examiner

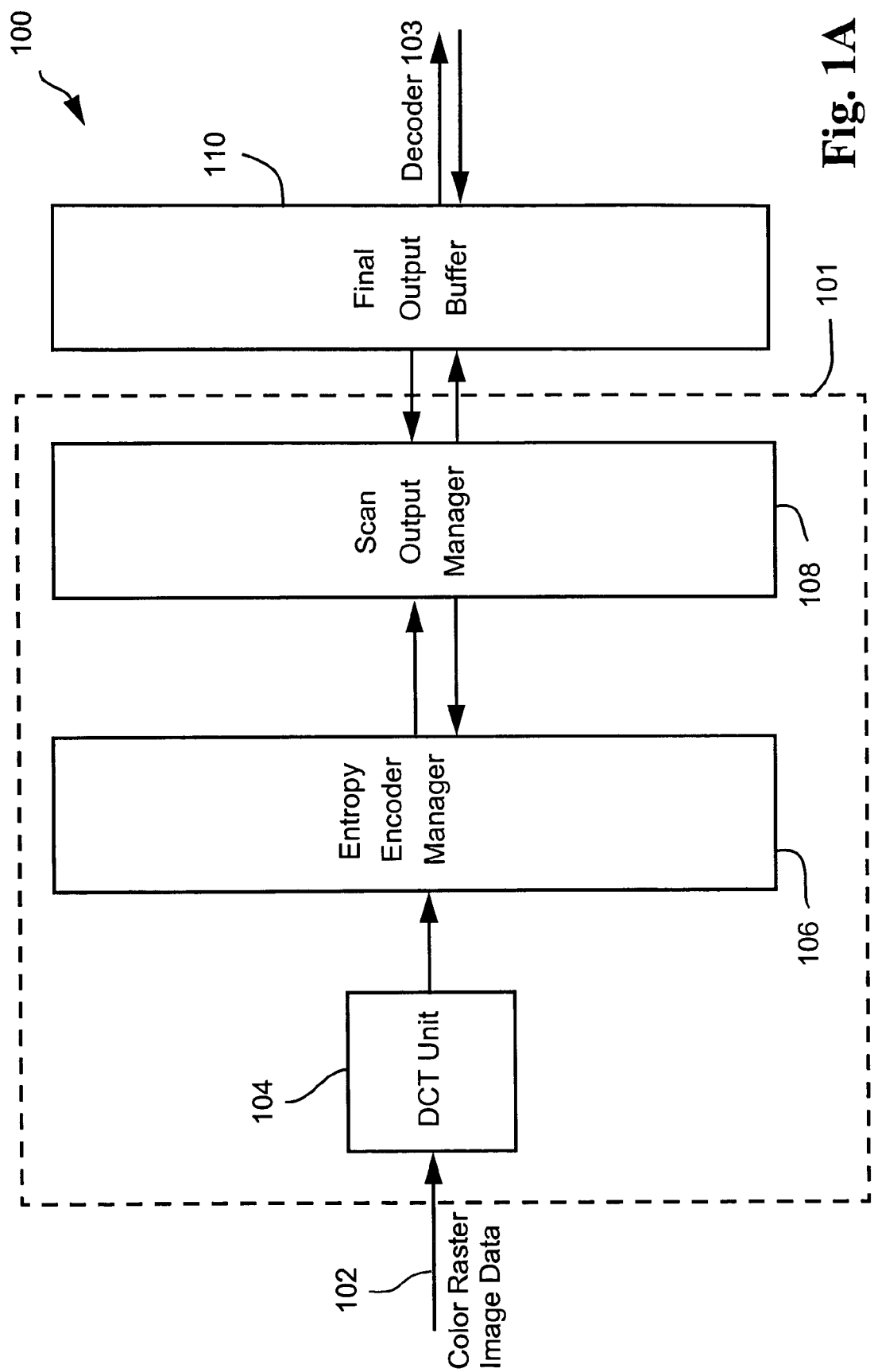

COMPRESSION INTO A FIXED SIZE BUFFER

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

FIELD OF THE INVENTION

The present invention relates to digital image compression and in particular to image compression in raster image processing systems where memory resources are limited.

BACKGROUND

Image compression is widely used in color raster image processing systems such as those found in printers. Image compression is used in these systems to reduce the amount of memory required to store raster images in the stages between pixel generation and the time when the final output has been delivered from the printer. Reducing the amount of memory reduces the total system cost.

In color printing environments the total uncompressed size of generated pixel images is often large and it is advantageous to avoid storing the entire image. Such pixel images are typically generated in raster or band order. In particular, pixels, scanlines, groups of scanlines, or tiles, are emitted in a stream from a raster image processor (RIP) that has as input an object graphic description of the page to be printed. In some simple cases this raster image data stream may be fed directly to a print engine. However in many circumstances this is not possible. This may be because the print engine requires real-time data delivery, because the image must be kept in case error recovery is required, or because the image must be kept for printing later in a duplexing system. Many other reasons exist. In systems where the raster image data must be kept, the image data is often fed to a compressor in a pipeline fashion such that intermediate storage between the RIP and the compressor is small compared with the total uncompressed image size. The output of the compressor is also considerably smaller than the uncompressed image size.

Many compression schemes can be used in this environment. One widely used method for color images is the baseline method of the Joint Photographic Experts Group (JPEG) standard. However compression using baseline JPEG standard and other methods suffers a number of serious flaws that makes use of such methods difficult in systems with limited memory resources. Existing compression schemes all exhibit one or more of the following flaws when presented with streamed input data:

The memory available to receive the compression data can be over-run. Compression schemes are typically highly data-dependent and without knowing details of the input data ahead of time it is not possible to predict what size output buffer will be required to accept the compressed data. This is a serious problem for systems with limited memory resources. Allocating a large output buffer is typically wasteful, and often still not a guarantee that the compressed data will fit. Some schemes exist that limit total compressed size by maintaining a sufficiently high compression factor on local regions of the image, but in these schemes it is not possible to trade off one part of the image that compresses well against another that does not.

For lossy compression schemes (such as baseline JPEG) the degree of loss must be selected ahead of time. Control of the degree of perceptual degradation (in short, loss) is a common method of controlling the output compression size. But this must generally be selected consistently across a whole image to achieve consistent visual quality, and must be selected at the start of the compression operation.

The image may become unnecessarily compressed. Where a high-loss setting is used for a compression operation, it may transpire that the image data compressed well and a less-lossy setting could have been used in comparison with the system's available memory. A less-lossy setting would have resulted in higher final image quality, which is advantageous.

The compression scheme may require random access to, or multiple passes over, the uncompressed image data. Some compression schemes exist that overcome one or more of the earlier problems by using either random access to the uncompressed image data or by performing multiple passes over it. But this is disadvantageous because it requires storage either of the uncompressed image data or of the original data that is used to generate the image data.

United States Patent Application Publication No. 20020131084 discloses an image processing apparatus for one-pass compression into a fixed size buffer. This system comprises a DCT unit for transforming blocks of pixels into respective blocks of transform coefficients, and a plurality of entropy encoders for encoding respective partitions of the DCT blocks where at least one partition comprises bit-plane data from each of the blocks of transform coefficients. The system also comprises a scan output manager for storing the entropy encoded partitions in a buffer of fixed memory size. The manager manages the storing of the coded partitions in the buffer whereby during the storing of the coded partitions if it is determined the buffer is full, a coded least perceptually significant partition currently stored in the buffer is overwritten by data from a coded more perceptually significant partition.

The aforementioned and other existing image compression schemes execute a series of steps or operations on the original input image data, in order to generate compressed image data. One step typical of most compression schemes is a transformation operation (for example, the Discrete Cosine Transform for JPEG compression), transforming a number of the original image pixels to produce a number of transform coefficients. Another step is an entropy encoding operation, whereby code words are assigned to the transformed coefficients. Both these steps execute, on average, many computations per pixel of the original image, and are critical to the efficiency of the overall compression algorithm.

A difficult image to compress is one whose uncompressed size to compressed size ratio is small. Difficult images present the greatest computational and bandwidth overheads when compressed into, and without overflowing, a fixed size buffer. The image processing apparatus disclosed in the aforementioned United States Patent Application has the disadvantage that it may execute extra, costly computations or require excessive bandwidth in order to avoid overflowing the fixed size buffer when compressing these difficult images.

These problems may also occur in many other related raster image processing systems such as digital cameras and scanners.

SUMMARY OF THE INVENTION

It is an object of the present invention to substantially overcome, or at least ameliorate, one or more disadvantages of existing arrangements.

According to one aspect of the invention, there is provided a method of compressing image data into a fixed size memory, the image data being arranged into a plurality of scans of bitstream data ordered from a perceptually most significant scan to a perceptually least significant scan, and each scan has associated therewith an attribute identifying whether the scans are active or inactive, the method comprising the steps of:

determining whether said scans are active or inactive;
   encoding the determined active scans of bitstream data;
   transferring the encoded scan bitstream data to the fixed size memory;
   setting, if the fixed size memory becomes full, the attribute of a perceptually least significant scan of the active scans to inactive.

According to another aspect of the invention, there is provided a method of compressing image data into a fixed size memory, the method comprising the steps of:

partitioning the image data into scan bitstream data, wherein the scans are ordered from a perceptually most significant scan to a perceptually least significant scan and wherein the scans have associated therewith an attribute determining whether a scan is active or inactive;
   determining whether said scans are active or inactive;
   encoding the determined active scans of bitstream data;
   transferring the encoded scan bitstream data to the fixed size memory; and
   setting, if the fixed size memory becomes full, the attribute of a perceptually least significant scan to inactive.

According to still another aspect of the invention, there is provided a method of storing coded image data of an image in a storage of fixed memory size, wherein the image comprises a plurality of pixels and the method comprises the steps of:

arranging the image into a plurality of bands each comprising a predetermined number N of consecutive lines of pixels;
   buffering and processing the bands one by one in turn, wherein the processing step comprises the following substeps for each currently buffered band:
      arranging the current band into a plurality of blocks of pixels of size M×M, wherein M is equal to said predetermined number N; and
      transforming the blocks of pixels to produce respective blocks of transform coefficients;
   partitioning the blocks of transform coefficients into a plurality of partitions wherein each partition comprises data from each block of transform coefficients and at least one partition comprises data from at least one but not all bit-planes of each block of transform coefficients, and wherein the plurality of partitions comprise a perceptually significant partition and a perceptually insignificant partition and partitions of varying perceptual significance there between, and wherein the partitions have associated therewith an attribute determining whether the partition is active or inactive;
   entropy coding each active partition; and
   managing the storing of the said entropy coded partitions in the storage of fixed memory size, wherein during the storing of said entropy coded partitions if it is determined the storage is full a coded least perceptually significant partition currently stored in the buffer is overwritten by data from a coded more perceptually significant partition, and the attribute of the overwritten perceptually least significant scan is set to inactive.

According to still another aspect of the invention, there is provided an apparatus for compressing image data into a fixed size memory, the image data being arranged into a plurality of scans of bitstream data, said plurality of scans comprising a perceptually most significant scan to a perceptually least significant scan, and each scan has associated therewith an attribute identifying whether the scans are active or inactive, the apparatus comprising:

means for determining whether said scans are active or inactive;
   means for encoding the determined active scans of bitstream data;
   means for transferring the encoded scan bitstream data to the fixed size memory;
   setting, if the fixed size memory becomes full, the attribute of a perceptually least significant scan to inactive.

According to still another aspect of the invention, there is provided an apparatus for compressing image data into a fixed size memory, the apparatus comprising:

means partitioning the image data into scan bitstream data, wherein the scans are ordered from a perceptually most significant scan to a perceptually least significant scan and wherein the scans have associated therewith an attribute determining whether a scan is active or inactive;
   means for determining whether said scans are active or inactive;
   means for encoding the determined active scans of bitstream data;
   means for transferring the encoded scan bitstream data to the fixed size memory; and
   means for setting, if the fixed size memory becomes full, the attribute of a perceptually least significant scan to inactive.

According to still another aspect of the invention, there is provided an apparatus for storing coded image data of an image in a storage of fixed memory size, wherein the image comprises a plurality of pixels and the apparatus comprises:

means for arranging the image into a plurality of bands each comprising a predetermined number N of consecutive lines of pixels;
   means for buffering and processing the bands one by one in turn, wherein the processing means comprises:
      means for arranging a currently buffered band into a plurality of blocks of pixels of size M×M, wherein M is equal to said predetermined number N; and
      means for transforming the blocks of pixels to produce respective blocks of transform coefficients;
   means for partitioning the blocks of transform coefficients into a plurality of partitions wherein each partition comprises data from each block of transform coefficients and at least one partition comprises data from at least one but not all bit-planes of each block of transform coefficients, and wherein the plurality of partitions comprise a perceptually significant partition and a perceptually insignificant partition and partitions of varying perceptual significance there between, and wherein the partitions have associated therewith an attribute determining whether the partition is active or inactive;
   means for entropy coding each active partition; and
   means for managing the storing of the said entropy coded partitions in the storage of fixed memory size, wherein during the storing of said entropy coded partitions if it is determined the storage is full a coded least perceptually significant partition currently stored in the buffer is overwritten by data from a coded more perceptually significant partition, and the attribute of the overwritten perceptually least significant scan is set to inactive.

According to still another aspect of the invention, there is provided a computer program for compressing image data into a fixed size memory, the image data being arranged into a plurality of scans of bitstream data, said plurality of scans comprising a perceptually most significant scan to a perceptually least significant scan, and each scan has associated therewith an attribute identifying whether the scans are active or inactive, the computer program comprising:

code for determining whether said scans are active or inactive;

code for encoding the determined active scans of bitstream data;

code for transferring the encoded scan bitstream data to the fixed size memory;

code, if the fixed size memory becomes full, the attribute of a perceptually least significant scan to inactive.

According to still another aspect of the invention, there is provided a computer program for compressing image data into a fixed size memory, the computer program comprising:

code partitioning the image data into scan bitstream data, wherein the scans are ordered from a perceptually most significant scan to a perceptually least significant scan and wherein the scans have associated therewith an attribute determining whether a scan is active or inactive;

code determining whether said scans are active or inactive;

code encoding the determined active scans of bitstream data;

code transferring the encoded scan bitstream data to the fixed size memory; and code setting, if the fixed size memory becomes full, the attribute of a perceptually least significant scan to inactive.

According to still another aspect of the invention, there is provided a computer program for storing coded image data of an image in a storage of fixed memory size, wherein the image comprises a plurality of pixels and the computer program comprises:

code for arranging the image into a plurality of bands each comprising a predetermined number N of consecutive lines of pixels;

code for buffering and processing the bands one by one in turn, wherein the processing code performs the following code for each currently buffered band:

code for arranging the current band into a plurality of blocks of pixels of size M×M, wherein M is equal to said predetermined number N; and code for transforming the blocks of pixels to produce respective blocks of transform coefficients;

code for partitioning the blocks of transform coefficients into a plurality of partitions wherein each partition comprises data from each block of transform coefficients and at least one partition comprises data from at least one but not all bit-planes of each block of transform coefficients, and wherein the plurality of partitions comprise a perceptually significant partition and a perceptually insignificant partition and partitions of varying perceptual significance there between, and wherein the partitions have associated therewith an attribute determining whether the partition is active or inactive;

code for entropy coding each active partition; and code for managing the storing of the said entropy coded partitions in the storage of fixed memory size, wherein during the storing of said entropy coded partitions if it is determined the storage is full a coded least perceptually significant partition currently stored in the buffer is overwritten by data from a coded more perceptually significant partition, and the attribute of the overwritten perceptually least significant scan is set to inactive.

According to a further aspect of the invention there is provided a system for compressing image data arranged into a plurality of scans of bitstream data, the plurality of scans being ordered from a perceptually most significant scan to a perceptually least significant scan, the system comprising:

a fixed-size memory;

a storage unit for storing information relating to said scans, the information comprising an attribute associated with each scan to identify the scan as active or inactive; and a processor connected to said fixed-size memory and said storage unit and adapted to compress said image data into said fixed-size memory, wherein said processor:

determines whether said scans are active or inactive;

encodes the determined active scans of bitstream data;

transfers the encoded scan bitstream data to the fixed size memory; and sets, if the fixed size memory becomes full, the attribute of a currently least significant scan of the active scans to inactive.

BRIEF DESCRIPTION OF THE DRAWINGS

A number of arrangements of the present invention will now be described with reference to the drawings, in which:

FIGS. 1A and 1B are a schematic diagram of an overview of an raster image processing system.

DETAILED DESCRIPTION INCLUDING BEST MODE

Figure 1B:
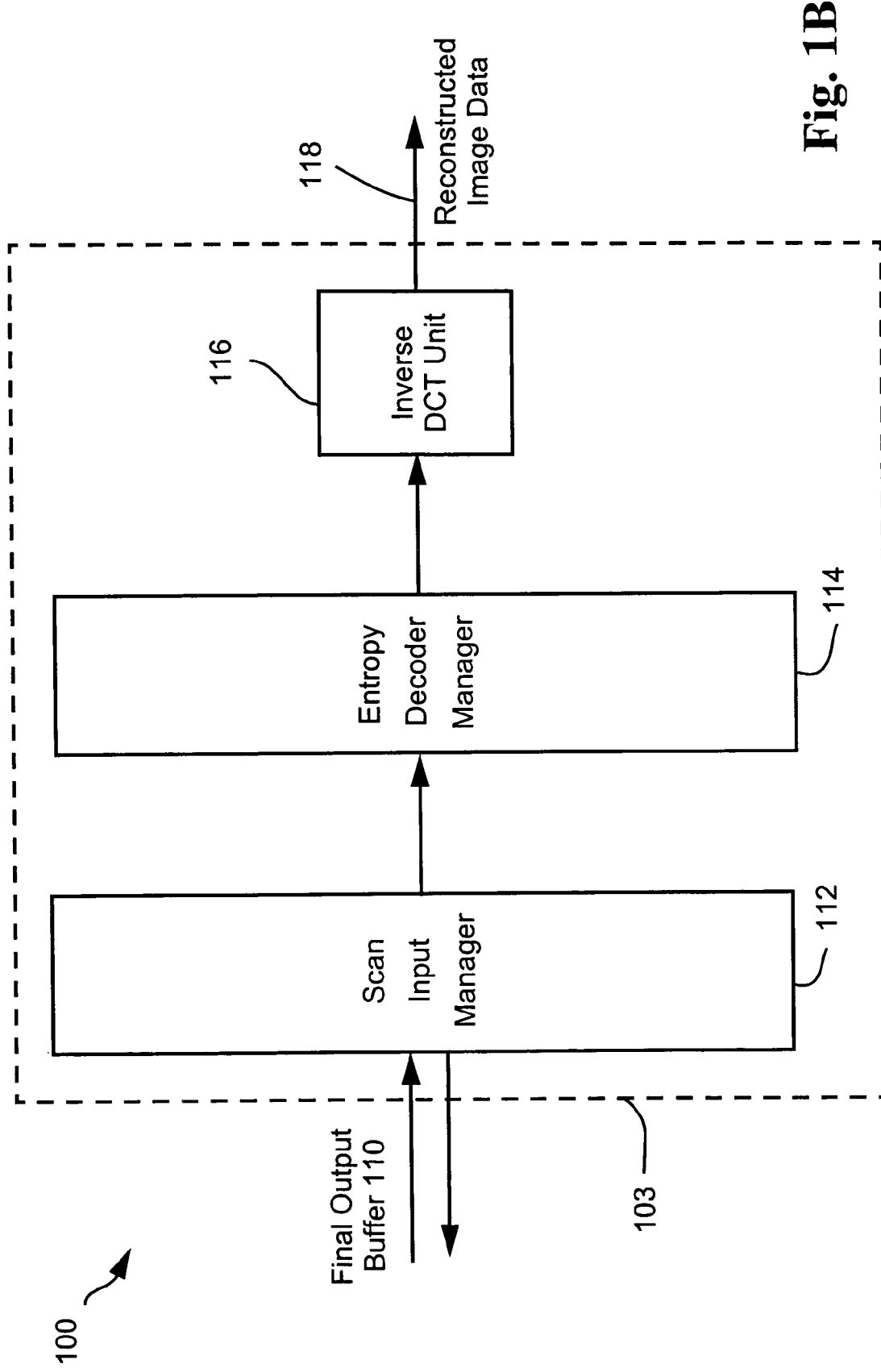

Where reference is made in any one or more of the accompanying drawings to steps and/or features, which have the same reference numerals, those steps and/or features have for the purposes of this description the same function(s) or operation(s), unless the contrary intention appears.

The principles of the arrangements described herein have general applicability to image compression. However, for ease of explanation, the arrangements are described with reference to image compression used in a color raster image processing system. However, it is not intended that the present invention be limited to the described arrangements. For example, the invention may have application to any arrangement utilising compression where memory resources are limited.

For most systems, the response time of a system is an important issue to the user. For example, it is desirable that the time taken to print a document, from the time that a user selects the "print" button within an application to the time that the document physically appears on the printer, is "relatively short". The meaning of "relatively short" is determined by a user's desires and expectations. Like many applications, printing is currently something that users desire to be faster.

When printing a document from a personal computer the document is typically converted from some page description language to printer pixels. This process is referred to as rendering. Compression is often used in the rendering process in order to facilitate a cost-effective solution. The time taken to render a document is often bound by the time taken for each of the sub-processes employed by the rendering process. For example, the time taken to compress a page of a document has an effect on the overall rendering speed. Certain hardware solutions dedicated to compression achieve a constant speed of compression regardless of the type of data input. In general, software solutions achieve a speed that is determined by the input data. This is particularly true when used with techniques such as those used in the apparatus disclosed in the United States Patent Application Publication Number 20020131084 which enables compression into a fixed sized buffer in one pass through an image.

The operational speed of a system or process (e.g. rendering), comprising sub-processes (e.g. compression) of variable speed, is often determined by the speed of the slowest sub-process. The slowest sub-process of that system is referred to as being the bottleneck of the system. In particular, the speed of the bottleneck process may be most critical for certain types of data. It is desirable to reduce the processing time of the bottleneck of a system in order to minimise the response time of that system. In addition, for certain applications there are real time constraints whereby a process of a system has to operate within a certain amount of time for the system to be functional: examples include some scanning and printing applications.

When used in a rendering pipeline the inventor has found that the compression speed of such image processing apparatus as disclosed in the aforementioned United States Patent Application is acceptable for many types of image data. However, for hard to compress or worst-case data, the image compression is slower than desired, and the compression can become the bottleneck in the system. Further, the inventor has recognised that this worst-case image data has certain characteristics that can be exploited in order to speed up the compression process.

The preferred arrangement is a software program operating on a general-purpose processing unit or as a sub-component of a larger software system. Turning now to FIGS. 1A and 1B, there is shown a preferred arrangement 100 of a raster image processing system. The arrangement 100 comprises an encoder 101, a final output buffer 110, and a decoder 103. The encoder 101 comprises a discrete cosine transform (DCT) unit 104 for accepting color raster image data 102, an entropy encoder manager 106 for entropy encoding the transform coefficients produced by the DCT unit 104, and a scan output manager 108 for managing the storing of the entropy encoded transform coefficients in the final output buffer 110 of fixed memory size. Prior to compressing the raster image data, each sub-process of the encoder 101 undertakes an initialisation process.

The color raster image data 102 is typically organised as four channels representing a cyan component (C), a magenta component (M), a yellow component (Y), and a black component (K) with 8 bits of precision per channel (referred to as CMYK). Other color representations such as one red, one green and one blue channel with 12 bits of precision per channel can also be used.

Preferably, the DCT unit 104 can be any known DCT unit which operates in conformity with the JPEG standard. Alternatively a lossless DCT can be used. A lossless DCT transforms integer pixels to integer transform coefficients. The DCT unit buffers the color raster image data for each channel so as to operate on 8 pixel by 8 pixel blocks of channel data. This is typically done by buffering 8 scan-lines of each channel data followed by the sequential processing of each 8 by 8 pixel block in the buffered scan-lines.

The preferred arrangement 100 of the image processing system follows a particular mode of progressive JPEG. If a lossless DCT is employed the arrangement 100 is not strictly speaking conformant to the JPEG standard. However, a lossless DCT system differs only in the transform from JPEG. Further other alternatives are possible without departing from the spirit and scope of the invention. A particular mixture of the progressive modes of successive approximation and spectral approximation is used by the arrangement.

In accordance with the JPEG standard, the DCT unit 104 performs a discrete cosine transform on each color channel of each 8×8 pixel block of image data, and the transformed data is quantised to produce a quantised block of data. For the purposes of this description, the quantiser is incorporated in the DCT unit 104 and is not shown. Preferably, the quantiser comprises one table of quantisation values for each color channel, and each quantisation value $q_{ij}=2^{n_{ij}}$ where the exponent $n_{ij}=0,1,2,\ldots,7$. The row and column indices of the transform coefficient block and quantisation table are $i=0,1,2,\ldots,7$ and $j=0,1,2,\ldots,7$ respectively. The quantisation process of scaling the transform coefficients $c_{ij}$ and truncating them to integer values is described in the JPEG standard. In the JPEG standard, as in the preferred arrangement, a rounding convention used in the quantisation process is adopted. However, in the preferred arrangement some of the algorithms implemented within the quantisation process are modified to account for quantisation values of a magnitude $2^{n_{ij}}$. The calculation of the quantised coefficients $r_{ij}$, obtained from the modified quantisation procedure of the preferred arrangement, is illustrated via the following pseudo-code.

```
if (c_ij > 0 )      // If a positive transform coefficient
{
    if (c_ij < (1 << (n_ij -1)))            // If c_ij / q_ij <1/2 ...
        r_ij = 0;                           // ...result rounds to zero
    else
        r_ij = (c_ij + (1 << (n_ij -1))) >> n_ij;   // Quantise coefficient by
                                                    //  bit-shifting
}
else                // If a negative transform coefficient
{
    if (-c_ij < (1 << (n_ij -1)))           // If (-c_ij)/q_ij < 1/2 ...
    {
        r_ij = 0;                           // ...result rounds to zero
    }
    else
    {
        r_ij = (-c_ij + (1 << (n_ij -1))) >> n_ij;  // Quantise magnitude of
                                                    //  coefficient
                                                    //  by bit-shifting
        r_ij = -r_ij;                       // Assign correct sign
                                            //  to magnitude
                                            //  of result
    }
}
```

Preferably the quantisation table for each color channel (component) is a "flat" table where each entry consists of the value 8 for each color component. However other quantisation tables are possible. An example of an alternative quantisation table is where the DC value is 2 for each component, and is 4 for the AC values for each component. In another example the DC value is 2 for each component, the AC values for the black component are 4, while for the cyan, magenta and yellow components the AC values are 8. If a lossless DCT is employed the quantisation step is optional, as the DCT coefficients are already integer values.

| Scan Table | | | |
|---|---|---|---|
| Scan number | Component | Ss-Se | Ah:Al |
| 1 | 0 | 0-0 | 0.2 |
| 2 | 1 | 0-0 | 0.2 |
| 3 | 2 | 0-0 | 0.2 |
| 4 | 3 | 0-0 | 0.2 |
| 5 | 0 | 1-32 | 0.2 |
| 6 | 1 | 1-32 | 0.2 |
| 7 | 2 | 1-32 | 0.2 |
| 8 | 3 | 1-32 | 0.2 |
| 9 | 0 | 33-63 | 0.2 |
| 10 | 1 | 33-63 | 0.2 |
| 11 | 2 | 33-63 | 0.2 |
| 12 | 3 | 33-63 | 0.2 |
| 13 | 0 | 0-0 | 2.1 |
| 14 | 1 | 0-0 | 2.1 |
| 15 | 2 | 0-0 | 2.1 |
| 16 | 3 | 0-0 | 2.1 |
| 17 | 0 | 1-32 | 2.1 |
| 18 | 1 | 1-32 | 2.1 |
| 19 | 2 | 1-32 | 2.1 |
| 20 | 3 | 1-32 | 2.1 |
| 21 | 0 | 33-63 | 2.1 |
| 22 | 1 | 33-63 | 2.1 |
| 23 | 2 | 33-63 | 2.1 |
| 24 | 3 | 33-63 | 2.1 |
| 25 | 0 | 0-0 | 1.0 |
| 26 | 1 | 0-0 | 1.0 |
| 27 | 2 | 0-0 | 1.0 |
| 28 | 3 | 0-0 | 1.0 |
| 29 | 0 | 1-32 | 1.0 |
| 30 | 1 | 1-32 | 1.0 |
| 31 | 2 | 1-32 | 1.0 |
| 32 | 3 | 1-32 | 1.0 |
| 33 | 0 | 33-63 | 1.0 |
| 34 | 1 | 33-63 | 1.0 |
| 35 | 2 | 33-63 | 1.0 |
| 36 | 3 | 33-63 | 1.0 |

Figure 5:
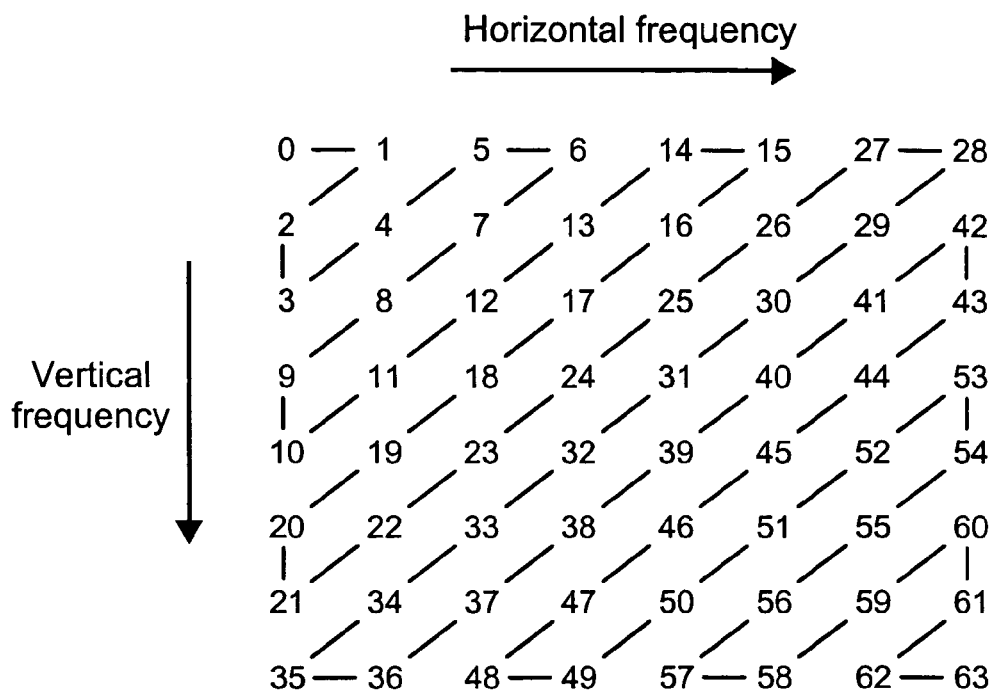
FIG. 5 illustrates the zigzag ordering of DCT coefficients.

The quantised blocks are converted to descriptors, and these descriptors are entropy encoded by the entropy encoder manager 106 in accordance with progressive JPEG. In the preferred arrangement the terms descriptor and scan are interchangeable. Preferably, the entropy encoder manager performs Huffman entropy encoding, and the scans are defined in accordance with the scan partitioning described in the Scan Table shown above. Each row in the scan table specifies one (encoding) scan. The scans are encoded in row order. The scan number column of the scan table lists each scan according to a nominal order of perceptual significance (described in greater detail below). The component column specifies which color channel is encoded in the scan. Component 0 is the cyan channel, component 1 is the magenta channel, component 2 is yellow channel and component 3 is the black channel. The Ss-Se column specifies the start (Ss) and end (Se) index, following a JPEG zigzag sequence of DCT coefficients (as illustrated in FIG. 5), of a contiguous sub-sequence of DCT coefficients that is encoded in the scan. For example, the fifth row of the table specifies that in the fifth scan DCT coefficients 1 to 32 of the cyan color channel are encoded (that is the first 32 AC coefficients in zigzag sequence). The Ah:Al column specifies the bit precision high and bit precision low parameters respectively used in the successive approximation mode of progressive JPEG.

The successive approximation mode of JPEG defines two slightly different point transforms. The use or purpose of the point transform is to notionally partition the coefficients by bit-plane. However, depending upon the point transform the result may or may not correspond to a bit-plane. Nevertheless, the term bit-plane is used herein to refer to a partition resulting from a point transform.

Figure 6:
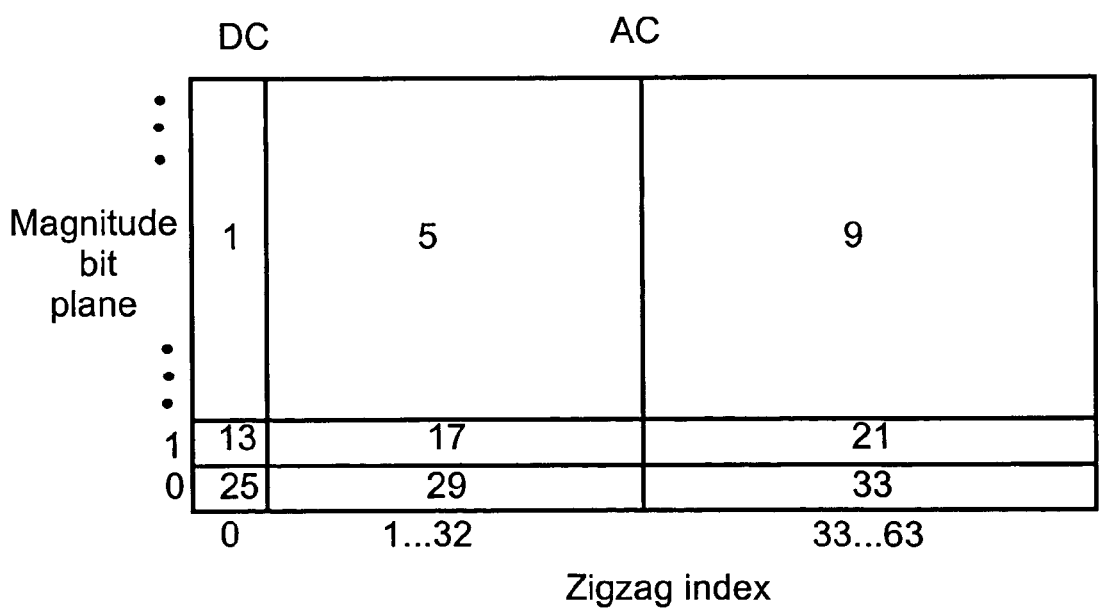
FIG. 6 shows the partitioning into spectral bands and bit-planes of a quantised block of data from the cyan channel according to one arrangement.

The preferred arrangement of scans of a particular color channel is such that the Huffman entropy encoder manager encodes scans of a color channel that differ in their perceptual contribution (or significance) to the resultant image. As an example, a quantised block of the cyan channel, partitioned into spectral bands and bit-planes, is illustrated in FIG. 6. The scan partitioning information for the cyan channel is obtained from scans with a component value 0 in the scan table. The vertical axis of the table describes the magnitude bit-plane of the coefficients in the block. The horizontal axis of the table describes the zigzag indexing of coefficients in the block. The block is partitioned into different scans, each scan labelled by a scan number (bold face) from the scan table.

In the preferred arrangement, the ordering of the perceptual significance of scans is achieved by arranging scans that are comprised of different spectral bands and bit-planes or groups of bit-planes. In this case scan 1 represents the perceptually most significant contribution to the cyan channel and scan 33 the perceptually least significant contribution to the cyan channel, with the other scans ordered in between these two extremes. For the first 3 scans 1, 5 and 9, multiple bit-planes of each coefficient band are effectively coded together. For the remaining scans 13, 17, 21, 25, 29, and 33, each bit-plane is separated into three scans: one for the DC coefficient, one for AC coefficients 1 to 32 and one for the remaining AC coefficients (coefficients 33-63). With respect to the preferred ordering, the DC coefficient is the most important, visually, for a given bit-plane or group of bit-planes, then the coefficient band 1 to 32, and then coefficients 33 to 63. Further, bit-planes of higher magnitude are more important, or visually significant, than those bit-planes of lower magnitude.

The entropy encoder manager 106 splits the DCT blocks into scans described by the scan table and entropy encodes those scans, outputting the encoded data into scan bitstreams such that each scan bitstream contains a portion of data from each DCT block in raster block order. In the preferred arrangement, as in the spectral and successive approximation specification for JPEG, scans are entropy encoded differently according to the spectral band type (DC or AC) and bit-plane type (most significant grouped bit-planes, or refinement singular bit-plane) of that scan. In this case four entropy encoders are employed to encode scans of the four different scan types: DC most significant (e.g. scan 1), DC refinement (e.g. scans 13 and 25), AC most significant (e.g. scans 5 and 9), and AC refinement (e.g. scans 17, 21, 29, and 33). In the preferred arrangement each scan listed in the scan table is encoded using an appropriate entropy encoder. Further other entropy encoder procedures are possible without departing from the spirit of the invention.

An efficient implementation of the entropy encoders used in the preferred arrangement is to separately compress groups of scans of the same color channel, spectral band type, and bit-plane type. This requires a method for the entropy encoder manager to be able to efficiently access groups of scans from the scan table possessing the same scan type. A structure for grouping scans from the scan table into color channels (C, M, Y, or K), DC or AC coefficients (spectral band), grouped (most significant) bit-planes or separate (refinement) bit-planes is described in the pseudo code below.

```
struct scan_map
{
  int dc_mostsignificant;
  int dc_refinement[MAX_SCANS_PER_COLOUR_CHANNEL];
  int ac_mostsignificant[MAX_SCANS_PER_COLOUR_CHANNEL];
  int ac_refinement[MAX_SCANS_PER_COLOUR_CHANNEL];
};
struct scan_map scan_type[MAX_COLOUR_CHANNELS];
```

Defined for each scan type is a corresponding set of scan number values listed in row order from the scan table. For example, the scan numbers relating to all the Cyan, AC refinement scans from the scan table are 17, 21, 29, and 33. By way of another example, the pseudo code below determines the scan number of the third scan of the set of Cyan, AC refinement scans provided from the scan table (described in the previous example).

```
// All scan types have been previously initialised
    scan_map_index = 2;    // The third scan in the set of
                           AC refinement scans
    colour_channel = 0;    // Cyan
    scan_number = scan_type[colour_
    channel].ac_refinement[scan_map_index] ;
    // This is the same as scan_number = 29
```

This method of accessing a particular scan from the scan table is referred to hereinafter as scan mapping. Further other reordering structures used for scan mapping are possible without departing from the spirit and scope of the invention. In the preferred arrangement, the entropy encoder manager assigns the appropriate scan number values to each scan type during the initialisation process.

Figure 3A:
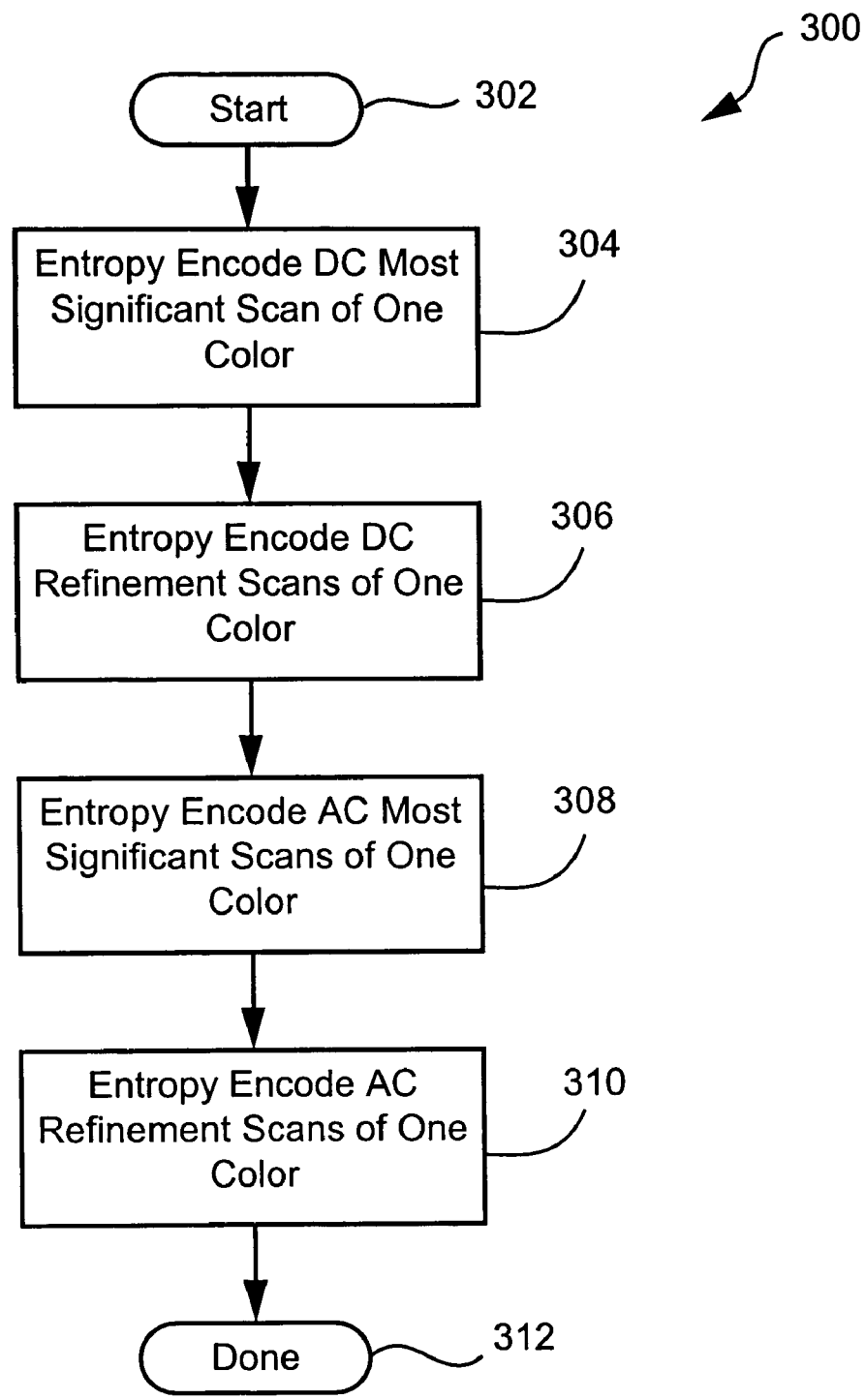
FIGS. 3A, 3B, and 3C show a flow chart of a method of managing the entropy encoding of uncompressed transform coefficient data from the DCT unit 104.
Figure 3B:
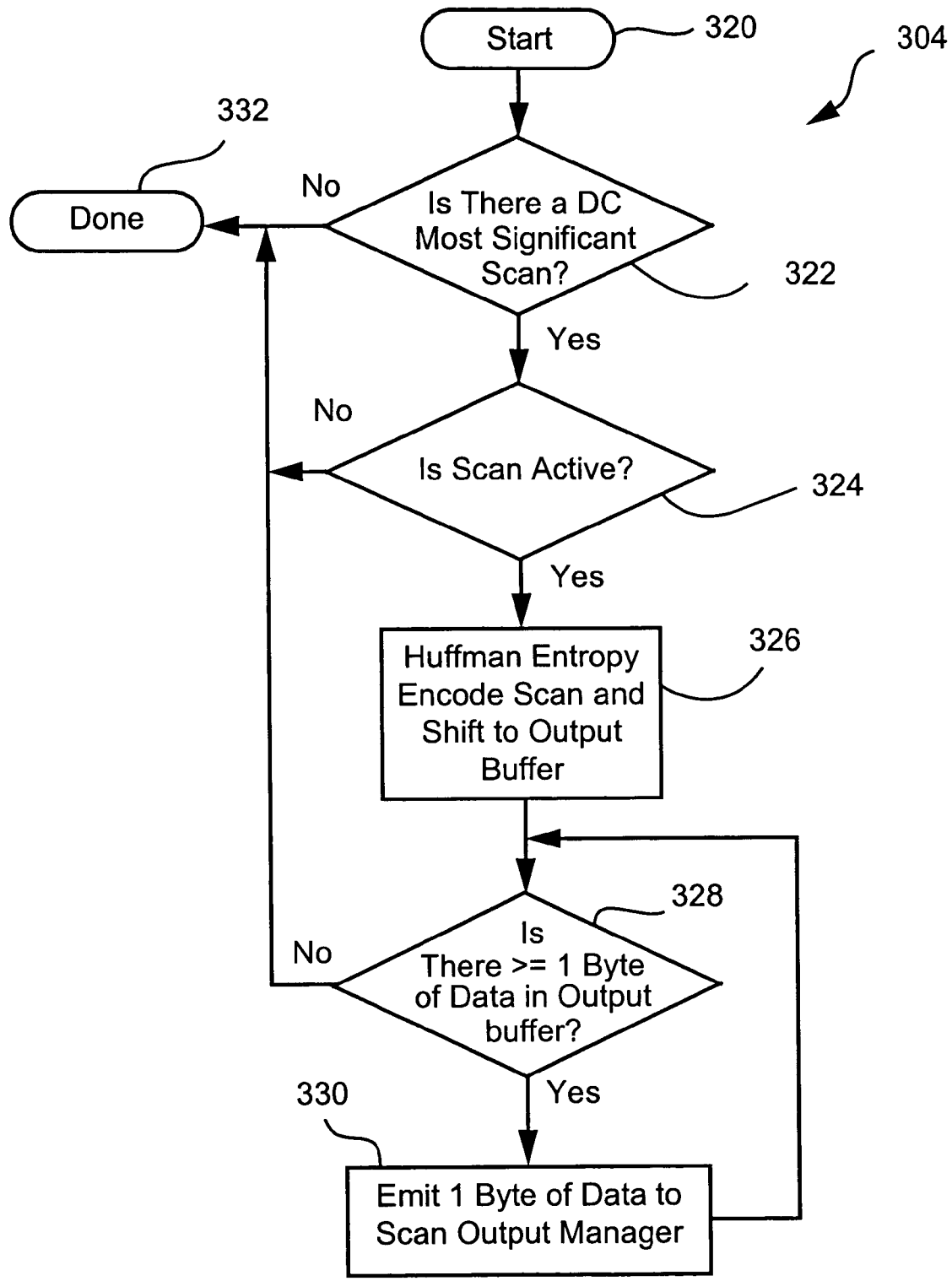
Figure 3C:
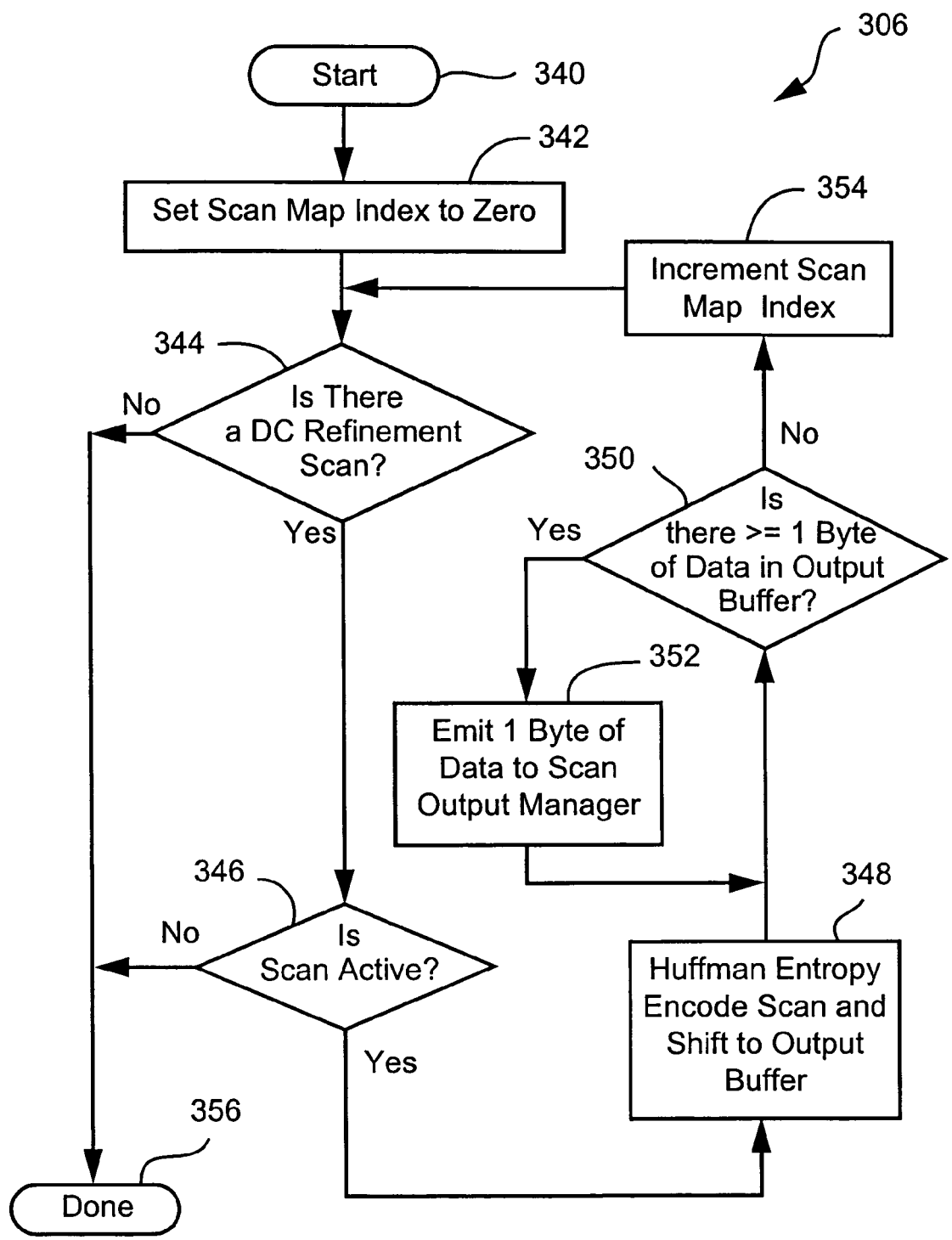

Turning now to FIGS. 3A, 3B, and 3C, there is shown a flow chart of the process of managing the entropy encoding of quantised transformed coefficient data. This process is performed by the entropy encoder manager 106, which is preferably implemented as a software program operating as a sub-component of a larger software system implementation of the preferred arrangement 100. The method 300 performed by the entropy encoder manager commences when the encoder 101 commences the encoding of the color raster data 102. Processing of the entropy encoder manager method 300 starts at step 302. Each time the entropy encoder manager receives a quantised block of data of a particular color channel, the DC most significant scan of that block is entropy encoded 304. After step 304 is completed, the DC refinement scans of that block are entropy encoded 306. After step 306 is completed, the AC most significant scans of that block are entropy encoded 308. Finally, after step 308 is completed, the AC refinement scans of that block are entropy encoded 310. Following the entropy encoding sub-process of step 310, the entropy encoder manager method 300 exits at step 312.

Turning now to FIG. 3B, there is shown a flow chart of the sub-processes of step 304 of FIG. 3A. The procedure for entropy encoding the DC most significant scan of the current quantised block starts at step 320. If a DC most significant scan of the color channel currently being encoded can not be found 322 in the scan table, then the sub-process of FIG. 3B exits at step 332. Otherwise, if a DC most significant scan of this color channel can be found in the scan table, then the entropy encoder manager selects this scan as the current scan to process. If it is determined that the selected scan is inactive 324, then the sub-process of FIG. 3B exits at step 332. A scan is inactive if the flag entry in the memory management table 200 of FIG. 2 (described in detail below) corresponding to that scan is set to inactive.

Otherwise, if it is determined that the selected scan is active 324 (that is the active flag entry in the memory management table is set to active), then that scan is encoded using the DC most significant Huffman entropy encoder procedure 326 mentioned above and described in progressive JPEG. The encoded scan data is output into a bit-stream that is shifted into an output buffer of the entropy encoder manager 106. This output buffer is 32 bytes or some similar size selected to allow a fraction of the buffer to be efficiently transferred through the memory sub-system used to access the final output buffer 110. There is one output (bit) stream corresponding to each encoded scan.

If the output buffer does not contain at least 1 byte (one word) of encoded scan data 328, then the sub-process of FIG. 3B exits at step 332. Otherwise, if the output buffer does contain at least one word of encoded scan data 328, then the entropy encoding manager proceeds to step 330. At step 330, one word from the output buffer is emitted to the scan output manager (described in greater detail below) 108, and that word is subsequently removed from the output buffer. The order for emitting and removing words from the output buffer follows a first-in, first-out process. That is, for a sequence of words present in the output buffer, the word that was shifted first into the output buffer will be the word that is emitted first to the scan output manager. After the word has been emitted to the scan output manager, the entropy encoder manager returns to step 328.

Turning now to FIG. 3C, there is shown a flow chart of the sub-processes of step 306 of FIG. 3A. The procedure for entropy encoding DC refinement scans of the current quantised block starts at step 340. The scan map index (used to map to, or obtain, the next DC refinement scan in the scan table, for the color channel currently being encoded) is set to zero 342. If the next DC refinement scan of this color channel cannot be found in the scan table 344, then the sub-process of FIG. 3C exits at step 356. Otherwise, if the next DC refinement scan of this color channel can be found in the scan table 344, then the entropy encoder manager selects this scan as the current scan to process.

If the selected scan is inactive 346, then the sub-process of FIG. 3C exits at step 356. Otherwise, if the selected scan is active 346, then the scan is encoded using the DC refinement Huffman entropy encoder procedure 348 mentioned above and described in progressive JPEG. The encoded scan data is output into a bit-stream that is shifted into an output buffer of the entropy encoder manager 106.

If the output buffer contains at least 1 byte (one word) of encoded scan data 350, then the entropy encoding manager proceeds to step 352. At step 352, one word from the output buffer is emitted to the scan output manager, and that word is subsequently removed from the output buffer. After the word has been emitted to the scan output manager, the entropy encoder manager returns to step 350.

Otherwise, if the output buffer does not contain at least one word of encoded scan data 350, the scan map index is incremented 354 by a value of one, and the entropy encoder manager returns to step 344. Once again, if the next DC refinement scan of this color channel can be found in the scan table, then the process of encoding the next (active) scan is repeated. Once all active scans of this scan type have been encoded, the sub-process of FIG. 3C exits at step 356.

Referring once again to FIG. 3A, after entropy encoding of the DC scans of the current block in steps 304 and 306 is complete, the entropy encoder manager proceeds to step 308, and then step 310, to encode the AC most significant and AC refinement scans respectively. The sub-processes of steps 308 and 310 follow the same procedure as the sub-process of step 306 in FIG. 3C, with one notable exception. The scan type encoded for step 308 is an AC most significant scan of the current color channel, and not a DC refinement scan. As a result, the AC most significant Huffman entropy encoder procedure is used to encode the AC most significant scan type. Similarly, the scan type encoded for step 310 is an AC refinement scan of the current color channel, encoded using the AC refinement Huffman entropy encoder procedure.

Figure 2:
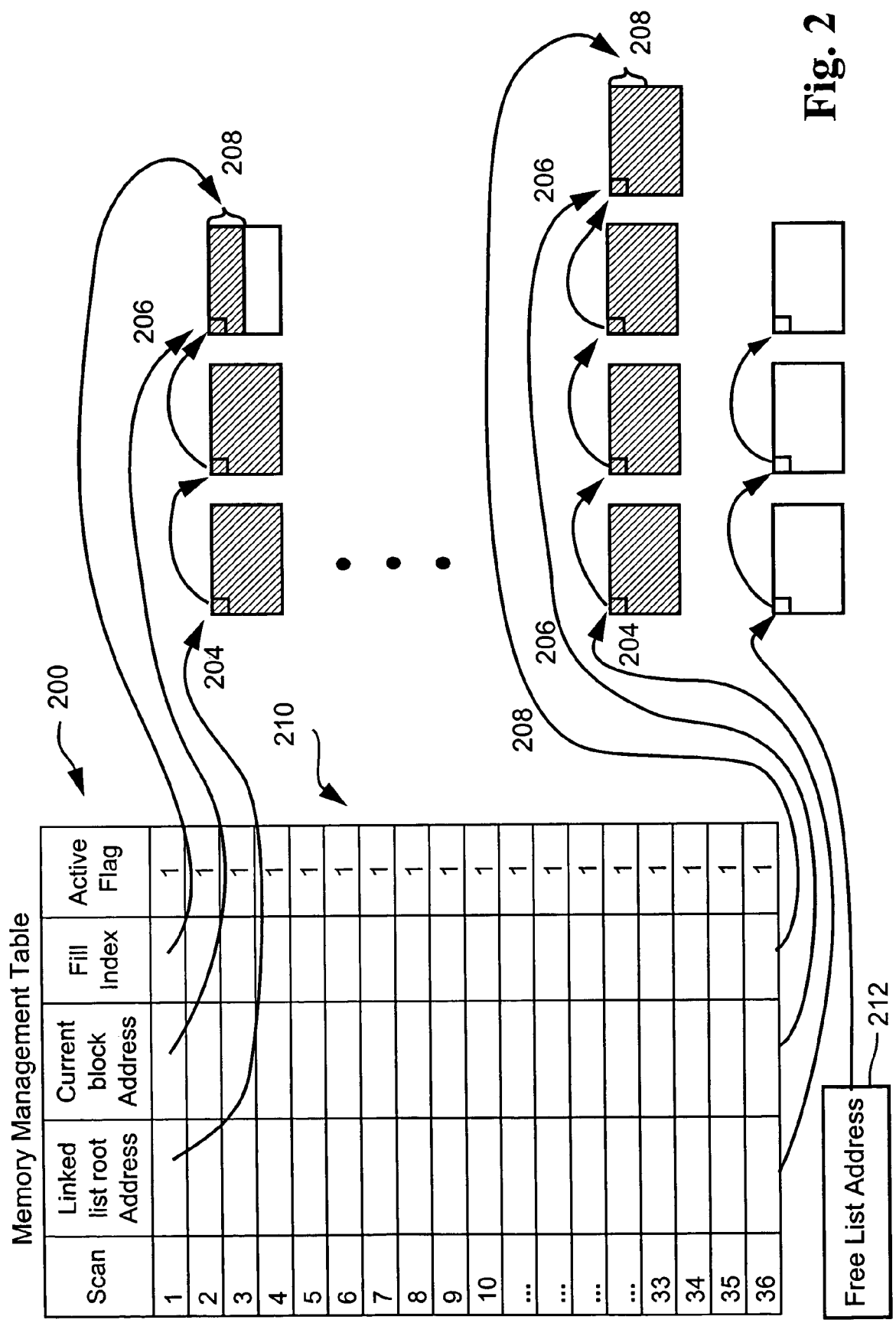
FIG. 2 illustrates an example of a number of linked lists and a memory management table used in the raster image processing system of FIGS. 1A and 1B.

The scan output manager 108 maintains a table in internal memory with four entries for each scan. An example of such a table 200 is shown in FIG. 2. These entries are:

1. A linked list root address 204. This is the address in the final output buffer 110 of the first of a linked list of blocks that contain the entropy encoded data of this stream.
2. A current block address 206. This is the address in the final output buffer 110 of the last block in the linked list and is the block that is currently being filled.
3. A fill index 208. This is a count of how many words of entropy encoded data have so far been written into the current block and is thus also the index at which new data will be written.
4. An active flag 210. This flag indicates whether this entropy encoded stream is still to produce data or whether the stream has been stopped.

The scan output manager 108 also holds in a free block register 212 the address in the final output buffer 110 of the first block of a linked list of free blocks that are not currently assigned to any active entropy encoded stream.

Initially, the active flags 210 of all scans are initialised to indicate that the scans are 'active'. In the example of FIG. 2, a '1' indicates that an active flag 210 is active. The flowcharts of FIG. 4B illustrates how active flags 210 are set to 'inactive'.

Figure 4A:
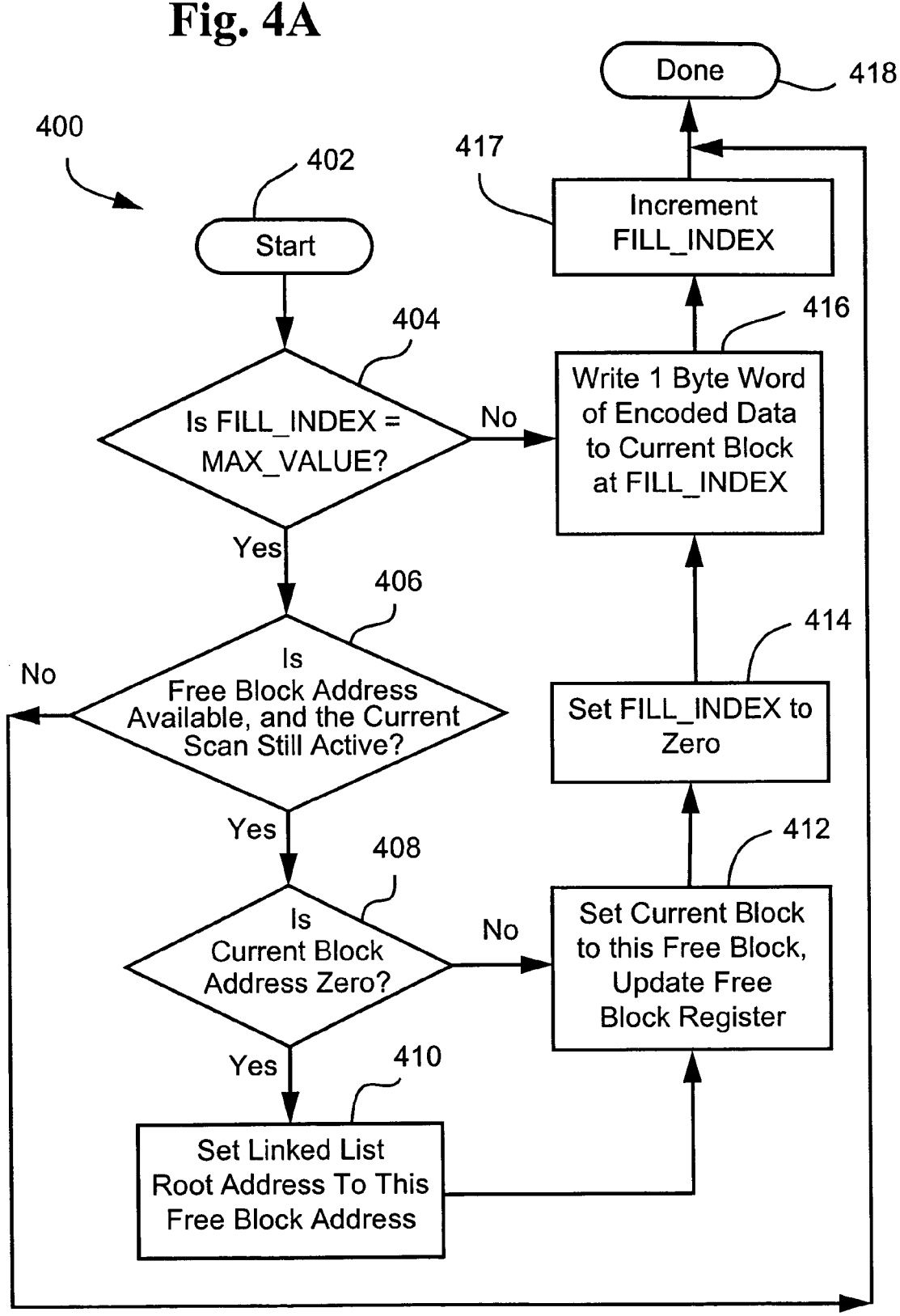
FIGS. 4A and 4B show a flow chart of a method of managing the storing of compressed image data in the final output buffer 110 of fixed memory size.
Figure 4B:
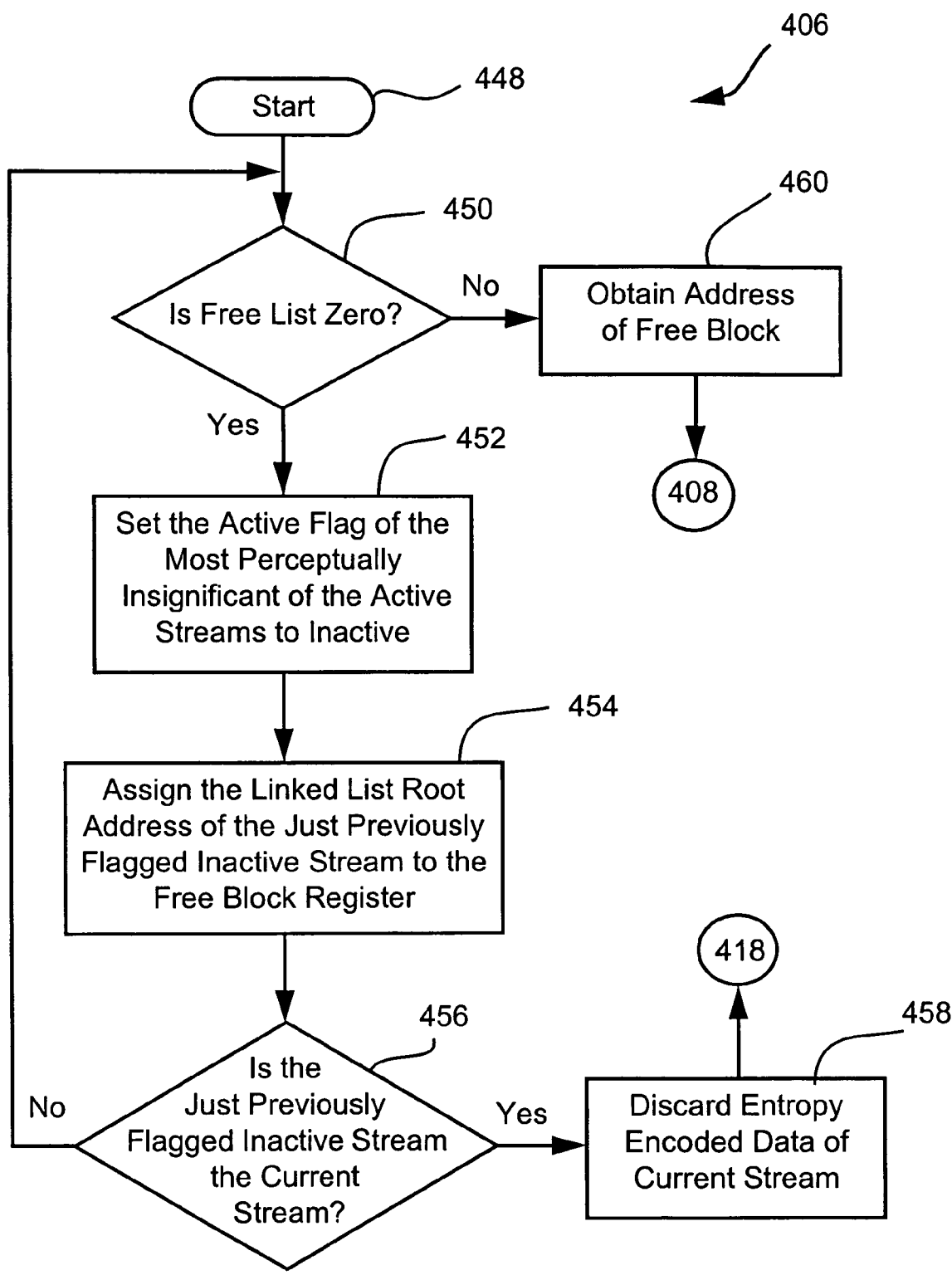

FIGS. 4A and 4B show a method of managing the storing of compressed image data in the final output buffer 110 of fixed memory size. This method is performed by the Scan Output Manager 108, which is preferably implemented as a software program operating as a sub-component of a larger software system implementation of the preferred arrangement 100. The scan output manager commences each time one of the four entropy encoders of the entropy encoder manager 106 emits a 1 byte word of encoded data to the scan output manager. Processing of the scan output manager method 400 starts at step 402. Each time the scan output manager 108 receives a 1 byte word of entropy encoded data to output to a particular scan stream (hereinafter called the current scan stream), the scan output manager considers, in step 404, the fill index entry 208 of the current scan stream in memory management table 200.

If the fill index entry 208 of the current scan stream is not equal to the maximum allowed value (the NO option of step 404), the scan output manager 108 proceeds to step 416. Otherwise, if the fill index entry 208 is equal to the maximum allowed value (the YES option of step 404), the scan output manager 108 checks, in step 406, whether the address of a free block is available, using a sub-process as described below with reference to FIG. 4B. If the address of a free block is obtained, but the current scan has been flagged as inactive from the sub-process of FIG. 4B (ie the NO option of step 406), the scan output manager method 400 terminates at step 418. Otherwise (the YES option of step 406), the scan output manager 108 considers, in step 408, whether the current block address entry 206 of the current scan stream in the memory management table 200 is zero.

If the current block address 206 is zero (the YES option of step 408), then in step 410 the linked list root address entry 204 in the memory management table 200 for the current scan stream is set to the free block address obtained in step 406. Then, in step 412, the current block address entry 206 in the memory management table 200 for the current scan stream is set to the free block address. Otherwise, if the current block address 206 is not zero (the NO option of step 408), then the scan output manager 108 proceeds directly to step 412, where the current block address entry 206 is set to this free block address. After the current block address entry is set to this free block address, the scan output manager 108 updates the free block register 212 to the address of the next free block in the linked list of free blocks.

If there are no more free blocks available in the linked list of free blocks, the scan output manager 108 sets the free block register 212 to zero.

Once step 412 is complete, in step 414 the scan output manager 108 sets the fill index entry 208 of the memory management table 200 to zero. After completion of step 414, the scan output manager proceeds to step 416.

During step 416, the 1 byte word of entropy encoded data that initiated process 400 is written by the scan output manager 108 into the final output buffer 110. This word of data is written to the location in the current block indicated by the current block address entry 206 and fill index entry 208 in the memory management table 200 corresponding to the current scan stream. After the data is written, the fill index entry 208 corresponding to the current scan stream is incremented in step 417 to account for the addition of the new data. The scan output manager 108 then proceeds to step 418, completing the processing of method 400. The scan output manager stores in the final output buffer 110 information indicating, for each scan stream, the corresponding scan stream number and corresponding linked list root address (if any).

FIG. 4B shows a flow chart of the sub-processes of step 406 of FIG. 4A. The sub-process for obtaining the address of a block of free memory starts at step 448, in which it is already known that the fill index entry 208 of the current scan stream is equal to the maximum allowed value. In step 450 the scan output manager 108 considers whether the free block register 212 is zero. If the free block register 212 is not zero (the NO option of step 450), then in step 460 the scan output manager 108 obtains the address of the free block stored in the free block register 212 and proceeds to step 408, completing the sub-process of obtaining the address of free block.

If the scan output manager determines in step 450 that the free block register 212 is zero (the YES option of step 450), then in step 452 the scan output manager 108 sets the active flag entry 210 in the memory management table 200 of the most perceptually insignificant of the active scan streams to inactive. An effect of setting a scan to inactive is that the entropy encoders no longer encode the scan, thus reducing the number of operations performed (refer to FIGS. 3B and 3C).

Preferably, when the scan output manager 108 sets a stream to inactive in step 452, scans comprising the same scan table values of Ss, Se, Al, and Ah but having different color component values are discarded simultaneously, in order to reduce any visual artifacts produced in the compressed image.

After the active flags of the most perceptually insignificant of the active streams have been set to inactive in step 452, the scan output manager 108, in step 454 assigns the linked list root address 204 of the scan stream flagged as inactive in step 452 to the free block register 212. Once the free block register 212 becomes non-zero, the address stored therein is used as the address of the next free block. Next, in step 456, the scan output manager 108 considers whether the scan stream that was just previously flagged inactive is the current scan stream.

If the entropy encoded stream that just became inactive is the current scan stream (the YES option of step 456), then in step 458 the 1 byte word of entropy encoded data is discarded and the scan output manager 108 proceeds to step 418, completing the processing of method 400. Otherwise (ie the NO option of step 456), the scan output manager 108 returns to decision block 450, in which the scan output manager determines whether the free block register 212 is zero.

The scan output manager 108 is able to detect that the final output buffer 110 is full by determining, in step 450, that the free block register 212 is zero. In this situation, the scan output manager 108, by assigning, in step 452, the linked root address 204 of the most perceptually insignificant scan stream to the free block register 212, allows data of a more perceptually significant scan stream to simply overwrite the most perceptually insignificant scan stream. In this way, the arrangement 100 performs a simple one-pass processing for fitting the compressed data into the final buffer of fixed memory size. The scan output manager 108 allocates the same scan, for example scan 28, of each DCT block to the same linked list. Thus when the scan output manager 108 assigns the linked root address 204 of the most insignificant scan stream to the free block register 212, the scan output manager 108 is effectively discarding from storage in the final output buffer 110 the same most perceptually insignificant scans of all the DCT blocks. Thus the perceptual degradation introduced to achieve compression of a fixed size is applied consistently to the whole image.

The operation of the scan output manager 108 is illustrated by the following pseudo code:

```
struct block
{
  struct block *next;
  word    data[MAX_VALUE];
};
struct stream
{
  struct block *head;
  struct block *current;
  int    fill_index;
  bool   active;
};
struct stream streams[18];
struct block *free_root;
int    n_active;
void
emit_entropy_encoded_data(int s, word data)
{
  if (streams[s].fill_index == MAX_VALUE)
  {
    while (free_root == NULL)
    {
      --n_active;
      free_root = streams[n_active].head;
      streams[n_active].active = false;
      if (n_active == s)
        return;
    }
    if (streams[s].current == NULL)
      streams[s].head = free_root;
    else
      streams[s].current->next = free_root;
    streams[s].current = free_root;
    free_root = free_root->next;
    streams[s].current->next = NULL;
    streams[s].fill_index = 0;
  }
```

```
  streams[s].current->data[streams[s].fill_index] = data;
  ++streams[s].fill_index;
}
```

The compressed image bit stream as it resides in the final output buffer 110 may not comply with the JPEG standard. This is the case because of the way the scans are kept as independent bit streams, as managed by the scan output manager 108, and not formed into one contiguous bit stream. However the linked list information describing the scan structure in the final output buffer 110 is maintained with the compressed image for decompression, thus the JPEG compressed bit stream can be reconstituted from this link list information and scan structure.

As an image is being compressed in substantially raster (or 8-line raster) order, the scan output manager 108 ensures that the compressed image bit stream does not overflow the final output buffer 110. Should the buffer 110 become full at any stage before encoding is complete, the scan output manager 108 discards the least perceptually significant scan that remains in the buffer 110, thereby reclaiming buffer space for remaining portions of the compressed image bit stream. In this way several scans may be discarded during encoding. Any scans discarded during encoding are not part of the final compressed image bit stream.

In the case where a lossless DCT is employed, if no scans are discarded the compressed image bit stream represents the input image without loss. That is, the compressed image bit stream can be decompressed to give the original input image.

Regardless of which transform is employed, should a compressed image bit stream, consisting of all scans, be too large for the final output buffer 110, the scan manager 108 ensures that the least perceptually significant scans are discarded. In this way the final compressed image bit stream consists of the perceptually most important scans, fits into the final output buffer 110, and is formed in one pass in substantially raster order.

Returning now to FIGS. 1A and 1B, the decoder 103 takes the compressed image from the final output buffer 110 and reconstructs the image. The decoder 103 comprises a scan input manager 112 for retrieving each compressed scan from the final output buffer, an entropy decoder manager 114 for decoding the scans, and an inverse DCT unit 116 for combining the scans into a block of transform coefficients and for performing an inverse discrete cosine on the decoded block. The image is decoded in substantially raster scan order, producing preferably 8 output pixel lines at once, commensurate with the usual decoding order of baseline JPEG. Each quantized DCT block is decoded from the compressed scans in block raster order. As with the encoding, in the preferred arrangement there are four unique Huffman decoding methods for decoding the bitstream scans of data. A particular Huffman decoding method is implemented depending on the scan table information for that scan being decoded. Each Huffman decoder is fed the necessary compressed data from the scan input manager 112. The scan input manager 112 first retrieves the linked list and scan mapping information from the final output buffer 110. From this information, the scan input manager 112 is able locate the scans in the final output buffer 110 and output the scans to be decoded by the appropriate Huffman decoding process. In the event where perceptually insignificant scans are not present in the final output buffer 110, the scan input manager 112 instructs the inverse DCT unit 116 to pad these scans with zeroes. Preferably, the entropy decoder manager 114 is adapted to distinguish between DCT blocks in a similar manner to the JPEG baseline manner. When the entropy decoding of the coefficients of a given block is complete the block is inverse quantized (left shifted) as necessary and inverse transformed with an inverse DCT to give a reconstructed image block 118.

In an alternate arrangement the compression process can be executed by a system that uses both hardware and software components. For example, in an alternate arrangement, processes 104 and 106 of FIG. 1A may be implemented on an ASIC, offering a high throughput for the computationally complex parts of the compression process. Process 108 is implemented in software running on a digital signal processor (DSP). The DSP also implements other parts of the rendering process. The ASIC communicates with the DSP via software interrupts. Each time the ASIC has generated another block of compressed data, it interrupts the DSP, transferring the block of data to the DSP. Process 108 then handles the compressed scan data in the usual manner. By sharing information regarding whether or not each scan is active between the DSP and ASIC the ASIC only interrupts the DSP with active scan data. In this way the number of interrupts is reduced, as is the bandwidth between the ASIC and DSP. Reducing the number of interrupts is advantageous by freeing up the amount of time the DSP has to perform other operations. In addition, reducing the bandwidth can also have a positive effect.

Figure 7:
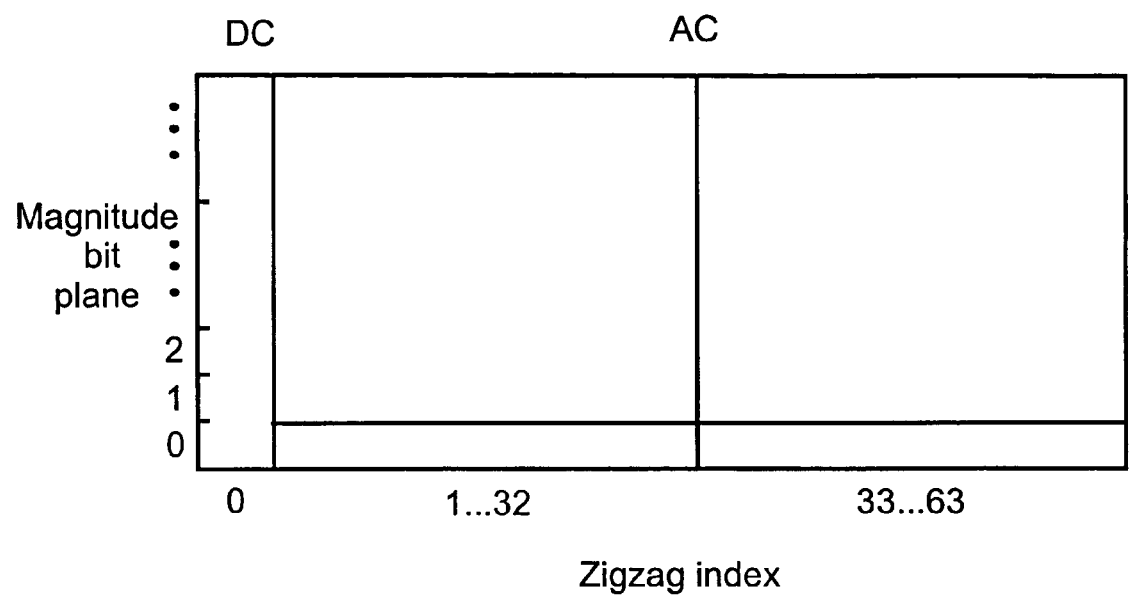
FIG. 7 shows the partitioning into spectral bands and bit-planes of a quantised block according to another arrangement.

If speed of compression is critical, an alternative arrangement can be used. In the alternative arrangement, transform coefficient blocks of data are partitioned so as to speed up the compression process. Instead of encoding a partitioned coefficient block of data comprising two refinement bit-planes (refer to FIG. 6.), a coefficient block is partitioned so as to comprise only one refinement bit-plane (as illustrated in FIG. 7). When fewer refinement bit-planes are encoded for a coefficient block of data, less time is required to encode that block. However, encoding more refinement bit-planes per block will typically result in smoother degradation of the compressed image quality if scans need to be discarded in order to avoid overflowing the fixed output buffer. There is typically a trade off between image quality and the speed of compression when compressing an image into a fixed sized buffer.

In summary, when compressing a typical image into a fixed size buffer, the more difficult the image is to compress, the more scans that will be discarded in order to fit the visually degraded compressed image into the buffer. The time taken to compress such a difficult image will be typically greater than the time it takes to compress an image that fits completely into the fixed size buffer, without loss of any bitstream scan data. For difficult images, avoiding entropy encoding bitstream scans of data that are inactive, or that have been discarded, substantially reduces the computational overhead of the encoding algorithm and the time taken to compress that difficult image. In addition, difficult images can also be time consuming to process in other parts of the rendering pipeline, such as the quantisation sub-process of the DCT unit. Employing a bit-shift operation (instead of a divide operation) for quantising with quantisation table values possessing an integral power of two magnitude can further reduce the computational overhead of the encoding algorithm. In addition there are other flow-on advantages to this more efficient processing.

The aforementioned preferred method(s) comprise a particular control flow. There are many other variants of the preferred method(s) which use different control flows without departing the spirit or scope of the invention.

INDUSTRIAL APPLICABILITY

It is apparent from the above that the arrangements described are applicable to the computer graphics and printing industries and other related industries.

The foregoing describes only some arrangements of the present invention, and modifications and/or changes can be made thereto without departing from the scope and spirit of the invention, the arrangement(s) being illustrative and not restrictive.

In the context of this specification, the word "comprising" means "including principally but not necessarily solely" or "having" or "including" and not "consisting only of". Variations of the word comprising, such as "comprise" and "comprises" have corresponding meanings.

I claim:

1. A method of compressing image data into a fixed size memory, the image data being encoded using a discrete cosine transformation and arranged into a plurality of scans of bitstream data, the plurality of scans being ordered from a perceptually most significant scan to a perceptually least significant scan, the method comprising the steps of:
   determining whether the scans are a DC most significant scan or not;
   determining whether the scans are active or inactive based on an attribute associated with each of the scans, the attribute being separate from the scan and identifying whether the scan is either active or inactive, wherein the active scan is to be encoded and the inactive scan is not to be encoded;
   encoding, if the scans are a DC most significant scan, the determined active scans of bitstream data encoded using the discrete cosine transformation and discarding the determined inactive scans without encoding the inactive scans, wherein said encoding comprises entropy encoding the current scan of bitstream data, if the attribute of the current scan is active, and otherwise proceeding to a next scan of bitstream data;
   transferring the encoded scan bitstream data to the fixed size memory; and
   setting, if the fixed size memory becomes full, the attribute of a currently least significant scan of the active scans to inactive.

2. A method according to claim 1, wherein the method further comprises the step of:
   deleting, if the fixed size memory becomes full, the encoded scan bit-stream data of the currently least significant scan.

3. A method according to claim 2, wherein the image data comprises a plurality of color components and said deleting step includes deleting corresponding encoded scan bit-stream data of more than one color component.

4. A method as claimed in claim 1, wherein the encoding step further comprises the step of:
   accessing a scan of bitstream data for encoding in accordance with a scan map.

5. A method as claimed in claim 1, wherein the image data comprises a plurality of quantizing 8×8 blocks of DCT transformed image data, and wherein the scans comprise, at least for each color component of the quantizing DCT transformed image data, two scans for the two least insignificant bitplanes of the group of AC coefficients 1 to 32, and two scans for the two least insignificant bitplanes of the group of AC coefficients 33 to 63.

6. A method according to claim 1 wherein the scans comprise DC most-significant scans, DC refinement scans, AC most-significant scans, and AC refinement scans.

7. A method according to claim 6, wherein one of the DC most-significant scans is the perceptually most significant scan and one of the AC refinement scans is the perceptually least significant scan.

8. A method of compressing image data into a fixed size memory, the method comprising the steps of:
   partitioning the image data into scans of bitstream data encoded using a discrete cosine transformation, wherein the scans are ordered from a perceptually most significant scan to a perceptually least significant scan;
   determining whether the scans are a DC most significant scan or not;
   determining whether the scans are active or inactive based on an attribute associated with each of the scans, the attribute being separate from the scan and identifying whether the scan is either active or inactive, wherein the active scan is to be encoded and the inactive scan is not to be encoded;
   encoding, if the scans are a DC most significant scan, the determined active scans of bitstream data encoded using the discrete cosine transformation and discarding the determined inactive scans without encoding the inactive scans, wherein said encoding comprises entropy encoding the current scan of bitstream data, if the attribute of the current scan is active, and otherwise proceeding to a next scan of bitstream data;
   transferring the encoded scan bitstream data to the fixed size memory; and
   setting, if the fixed size memory becomes full, the attribute of a currently least significant scan of the active scans to inactive.

9. A method of storing coded image data of an image in a storage of fixed memory size, wherein the image comprises a plurality of pixels and the method comprises the steps of:
   arranging the image into a plurality of bands each comprising a predetermined number N of consecutive lines of pixels;
   buffering and processing the bands one by one in turn, wherein said processing step comprises the following sub-steps for each currently buffered band:
   arranging the current band into a plurality of blocks of pixels of size M×M, wherein M is equal to the predetermined number N; and
   transforming the blocks of pixels using a discrete cosine transformation to produce respective blocks of transform coefficients;
   partitioning the blocks of transform coefficients into a plurality of partitions wherein each partition comprises data from each block of transform coefficients and at least one partition comprises data from at least one but not all bit-planes of each block of transform coefficients, and wherein the plurality of partitions comprise a perceptually significant partition and a perceptually insignificant partition and partitions of varying perceptual significance therebetween, and wherein each of the partitions have associated therewith a corresponding attribute separate from the partition and identifying whether the partition is active or inactive, wherein the active partition is to be encoded and the inactive partition is not to be encoded;
   entropy coding, if the partitions are a perceptually significant partition, each active partition of the blocks of transformed coefficients while discarding the inactive partitions without encoding the inactive partitions, wherein said entropy coding comprises entropy encoding the current scan of bitstream data, if the attribute of the current scan is active, and otherwise proceeding to a next scan of bitstream data; and
   storing the entropy coded partitions in the storage of fixed memory size, wherein, during the storing of the entropy coded partitions, if it is determined that the storage is full, a coded least perceptually significant partition currently stored in the storage is overwritten by data from a coded more perceptually significant partition, and the attribute of the overwritten perceptually least significant partition is set to inactive.

10. Apparatus for compressing image data into a fixed size memory, the image data being encoded using a discrete cosine transformation and arranged into a plurality of scans of bitstream data, the plurality of scans comprising a perceptually most significant scan to a perceptually least significant scan, the apparatus comprising:
    means for determining whether the scans are a DC most significant scan or not;
    means for determining whether the scans are active or inactive based on an attribute associated with each of the scans, the attribute being separate from the scan and identifying whether the scan is either active or inactive, wherein the active scan is to be encoded and the inactive scan is not to be encoded;
    means for encoding, if the scans are a DC most significant scan, the determined active scans of bitstream data encoded using the discrete cosine transformation and discarding the determined inactive scans without encoding the inactive scans, wherein said encoding comprises entropy encoding the current scan of bitstream data, if the attribute of the current scan is active, and otherwise proceeding to a next scan of bitstream data;
    means for transferring the encoded scan bitstream data to the fixed size memory; and
    means for setting, if the fixed size memory becomes full, the attribute of a currently least significant scan to inactive, wherein the inactive scans are not encoded.

11. Apparatus for compressing image data into a fixed size memory, the apparatus comprising:
    means for partitioning the image data into scan bitstream data encoded using a discrete cosine transform, wherein the scans are ordered from a perceptually most significant scan to a perceptually least significant scan;
    means for determining whether the scans are a DC most significant scan or not;
    means for determining whether the scans are active or inactive based on an attribute associated with each of the scans, the attribute being separate from the scan and identifying whether the scan is either active or inactive, wherein the active scan is to be encoded and the inactive scan is not to be encoded;
    means for encoding, if the scans are a DC most significant scan, the determined active scans of bitstream data encoded using the discrete cosine transformation and discarding the determined inactive scans without encoding the inactive scans, wherein said encoding comprises entropy encoding the current scan of bitstream data, if the attribute of the current scan is active, and otherwise proceeding to a next scan of bitstream data;
    means for transferring the encoded scan bitstream data to the fixed size memory; and
    means for setting, if the fixed size memory becomes full, the attribute of a currently least significant scan of the active scans to inactive.

12. Apparatus for storing coded image data of an image in a storage of fixed memory size, wherein the image comprises a plurality of pixels and the apparatus comprises:

means for arranging the image into a plurality of bands each comprising a predetermined number N of consecutive lines of pixels;

means for buffering and processing the bands one by one in turn, wherein the processing means comprises:

means for arranging a currently buffered band into a plurality of blocks of pixels of size M×M, wherein M is equal to said predetermined number N; and means for transforming the blocks of pixels using a discrete cosine transformation to produce respective blocks of transform coefficients;

means for partitioning the blocks of transform coefficients into a plurality of partitions wherein each partition comprises data from each block of transform coefficients and at least one partition comprises data from at least one but not all bit-planes of each block of transform coefficients, and wherein the plurality of partitions comprise a perceptually significant partition and a perceptually insignificant partition and partitions of varying perceptual significance there between, and wherein each of the partitions have associated therewith a corresponding attribute separate from the partition and identifying whether the partition is active or inactive, wherein the active partition is to be encoded and the inactive partition is not to be encoded;

means for entropy coding, if the partitions are a perceptually significant partition, each active partition of the blocks of transform coefficients and discarding each inactive partition without encoding the inactive partitions, wherein said encoding comprises entropy encoding the current scan of bitstream data, if the attribute of the current scan is active, and otherwise proceeding to a next scan of bitstream data; and means for storing the entropy coded partitions in the storage of fixed memory size, wherein during the storing of the entropy coded partitions, if it is determined that the storage is full a coded least perceptually significant partition currently stored in the storage is overwritten by data from a coded more perceptually significant partition, and the attribute of the overwritten perceptually least significant partition is set to inactive.

13. A computer program product comprising computer readable program code recorded on a machine-readable recording medium, for controlling the operation of a data processing apparatus on which the program code executes to perform a method of compressing image data into a fixed size memory, the image data being encoded using a discrete cosine transformation and arranged into a plurality of scans of bitstream data, the plurality of scans ordered from a perceptually most significant scan to a perceptually least significant scan, the method comprising the steps of:

determining whether the scans are a DC most significant scan or not;

determining whether the scans are active or inactive based on an attribute associated with each of the scans, the attribute being separate from the scan and identifying whether the scan is either active or inactive, wherein the active scan is to be encoded and the inactive scan is not to be encoded;

encoding, if the scans are a DC most significant scan, the determined active scans of bitstream data encoded using the discrete cosine transformation and discarding the determined inactive scans without encoding the inactive scans, wherein said encoding comprises entropy encoding the current scan of bitstream data, if the attribute of the current scan is active, and otherwise proceeding to a next scan of bitstream data;

transferring the encoded scan bitstream data to the fixed size memory; and setting, if the fixed size memory becomes full, the attribute of a currently least significant scan of the active scans to inactive.

14. A computer program product comprising computer readable program code recorded on a machine-readable recording medium, for controlling the operation of a data processing apparatus on which the program code executes to perform a method of compressing image data into a fixed size memory, the method comprising the steps of:

partitioning the image data into scans of bitstream data encoded using a discrete cosine transformation, wherein the scans are ordered from a perceptually most significant scan to a perceptually least significant scan;

determining whether the scans are a DC most significant scan or not;

determining whether the scans are active or inactive based on an attribute associated with each of the scans, the attribute being separate from the scan and identifying whether the scan is either active or inactive, wherein the active scan is to be encoded and the inactive scan is not to be encoded;

encoding, if the scans are a DC most significant scan, the determined active scans of bitstream data encoded using the discrete cosine transformation and discarding the determined inactive scans without encoding the inactive scans, wherein said encoding comprises entropy encoding the current scan of bitstream data, if the attribute of the current scan is active, and otherwise proceeding to a next scan of bitstream data;

transferring the encoded scan bitstream data to the fixed size memory; and setting, if the fixed size memory becomes full, the attribute of a currently least significant scan of the active scans to inactive.

15. A computer program product comprising computer readable program code recorded on a machine-readable recording medium, for controlling the operation of a data processing apparatus on which the program code executes to perform a method of storing coded image data of an image in a storage of fixed memory size, wherein the image comprises a plurality of pixels and the method comprises the steps of:

arranging the image into a plurality of bands each comprising a predetermined number N of consecutive lines of pixels;

buffering and processing the bands one by one in turn, wherein the processing step comprises the following sub-steps for each currently buffered band:

arranging the current band into a plurality of blocks of pixels of size M×M, wherein M is equal to said predetermined number N; and transforming using a discrete cosine transformation the blocks of pixels to produce respective blocks of transform coefficients;

partitioning the blocks of transform coefficients into a plurality of partitions, wherein each partition comprises data from each block of transform coefficients and at least one partition comprises data from at least one but not all bit-planes of each block of transform coefficients, the plurality of partitions comprise a perceptually significant partition and a perceptually insignificant partition and partitions of varying perceptual significance therebetween, and each of the partitions have associated therewith a corresponding attribute separate from the partition and identifying whether the partition is active or inactive;

entropy coding each active partition and discarding the inactive partitions without encoding the inactive partitions if the partitions are a perceptually significant partition, wherein said encoding comprises entropy encoding the current scan of bitstream data, if the attribute of the current scan is active, and otherwise proceeding to a next scan of bitstream data; and storing the entropy coded partitions in the storage of fixed memory size, wherein, during the storing of said entropy coded partitions, if it is determined that the storage is full, a coded least perceptually significant partition currently stored in the storage is overwritten by data from a coded more perceptually significant partition, and the attribute of the overwritten perceptually least significant partitions is set to inactive.

16. A system for compressing image data encoded using a discrete cosine transformation and arranged into a plurality of scans of bitstream data, the plurality of scans being ordered from a perceptually most significant scan to a perceptually least significant scan, the system comprising:

a fixed-size memory;

a storage unit for storing information relating to the scans, the information comprising an attribute associated with and separate from each scan to identify the scan as active or inactive; and a processor connected to said fixed-size memory and said storage unit and adapted to compress the image data into said fixed-size memory, wherein said processor:

determines whether the scans are a DC most significant scan or not;

determines whether the scans are active or inactive based on the corresponding attribute, wherein an active scan is to be encoded and an inactive scan is not to be encoded;

encodes, if the scans are a DC most significant scan, the determined active scans of bitstream data encoded using the discrete cosine transformation and discards the determined inactive scans without encoding the inactive scans, wherein said encoding comprises entropy encoding the current scan of bitstream data, if the attribute of the current scan is active, and otherwise proceeding to a next scan of bitstream data;

transfers the encoded scan bitstream data to the fixed size memory; and sets, if the fixed size memory becomes full, the attribute of a currently least significant scan of the active scans to inactive, wherein the inactive scans are not encoded.

* * * * *